(No Model.)

I. SACHS.
CULTIVATOR.

No. 430,693. Patented June 24, 1890.

WITNESSES
F. L. Durand
Marcus L. Byng

INVENTOR
Isaac Sachs
Geo. C. Poulton
his Attorney

UNITED STATES PATENT OFFICE.

ISAAC SACHS, OF CLAYSVILLE, PENNSYLVANIA.

CULTIVATOR.

SPECIFICATION forming part of Letters Patent No. 430,693, dated June 24, 1890.

Application filed March 19, 1889. Renewed May 19, 1890. Serial No. 352,371. (No model.)

*To all whom it may concern:*

Be it known that I, ISAAC SACHS, a citizen of the United States, residing at Claysville, in the county of Washington and State of Pennsylvania, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in cultivators; and it consists in the construction and arrangement of parts, as will be hereinafter described, and particularly pointed out in the claim.

The above-mentioned objects I attain by the means illustrated in the accompanying drawings, in which—

Figure 1:
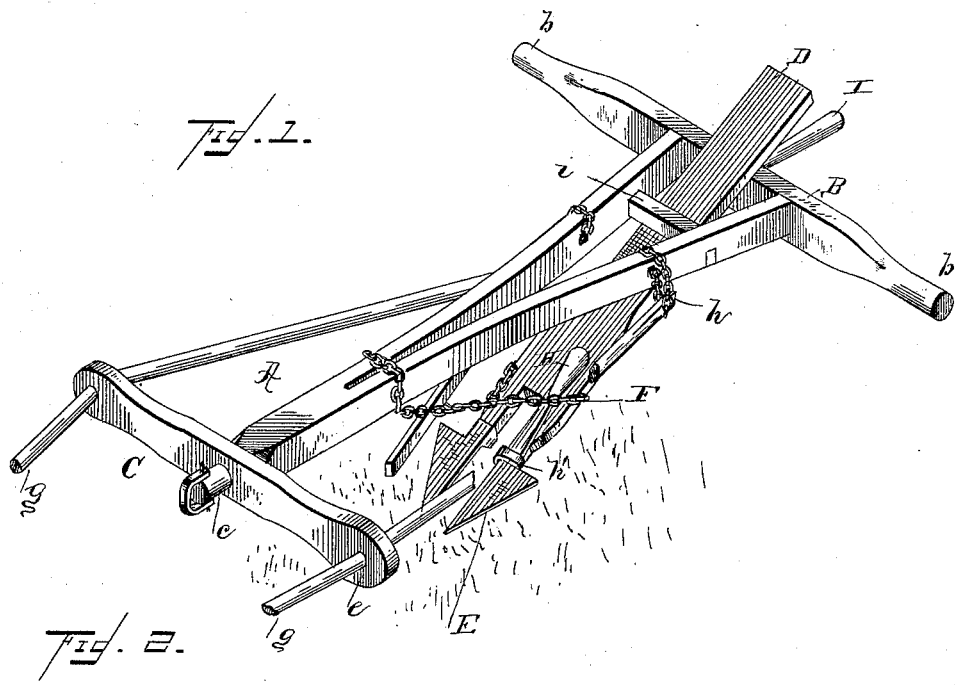
Figure 2:
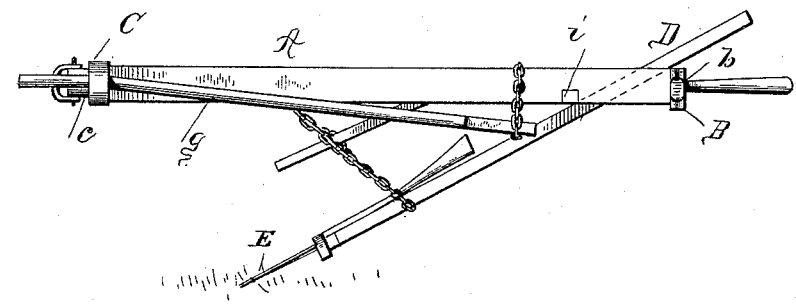
Figure 3:
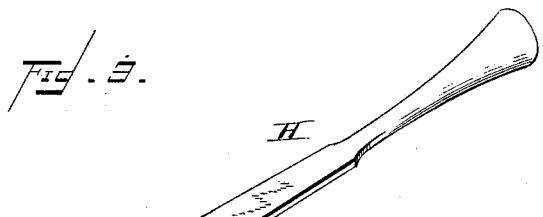

Figure 1 represents a perspective view, showing my improved cultivator complete. Fig. 2 represents a side elevation of the cultivator; and Fig. 3 represents a detached perspective view of a detachable earth-turner, which may be applied to either side of the cultivator to throw the earth to the right or to the left, as may be desired.

Referring to the drawings, the letter A indicates the main beam of the cultivator, which is bifurcated at its rear, and has attached to it a cross-beam B, with handles $b$ at the ends. The forward end of said beam is formed with a short cylindrical extension $c$, to which a clevis $d$ is attached. To the said extension is also swiveled a cross-bar C, having apertures $e$, through which the draft-rods $g$ pass. These draft-rods are secured at their rear ends to the members of the bifurcated main beam by means of chains $h$ or other loose connections.

The letter D indicates the share-beam, which consists of a strip of elastic wood or other material secured between the center of the cross-beam B, and a cross-bar $i$ is located between the members of the bifurcated main beam, as shown in Figs. 1 and 2 of the drawings. The said beam D is bifurcated at its forward or lower end, and is provided with the angular plow-shares or shovels E, of a shape substantially as shown in Fig 1 of the drawings, which serve to upturn the earth when the cultivator is drawn forward after the manner of the shares of an ordinary plow. Around the share-beam is passed a chain F, which also passes around the main beam A, and between the parts of the chain is passed a bar G, which may be turned so as to twist the chain and vary the tension thereof, and thus adjust the inclination of the share-beam D.

The letter H indicates a detachable earth-turner, which may be applied to either side of the bifurcated portion of the share-beam, as shown in Figs. 1 and 2 of the drawings. The said earth-turner is provided at its forward end with lateral arms $h'$, which embrace the bifurcated portions of the share-beam when in place, so as to hold it firmly in position and throw the earth to either side, according to its location.

I indicates a handle located at the middle of the cross-bar B, for the purpose hereinafter explained.

The forward ends of the draft-rods $g$ are provided with connections for the attachment of the traces of the draft-animals, so as to equalize the draft at each side of the cultivator.

The operation of my invention will be readily understood in connection with the above description, and is as follows: The animals being properly hitched to the clevis or draft-rods, the plowman takes his place at the rear of the cultivator and manages it by means of the handles $b$ on the arm B, so as to tilt the plow to one side, thereby bringing the plowshare on the side to which the plow is tilted into position to enter the earth when the plow is drawn in one direction. When the plow is traveling in the opposite direction, the plow is tilted to the opposite side. When the earth is to be thrown to the right, the earth-turner H is placed at the left of the share-beam, and vice versa.

To adjust the share-beam it is only necessary to turn the bar G so as to twist or untwist the chain, thus varying the elevation of said beam. The bar G is locked in position when the share-beam is adjusted by bringing its free end against one of the sides of the bifurcated portion of the main beam.

The forward ends of the draft-bars g are to be connected with the traces of the harness of the animal, and by the freedom of their movement through the swiveled cross-bar permit the plow to be turned freely to either side, the handle I being grasped by one hand of the plowman, while either of the handles b is manipulated by the other hand of the plowman.

Having thus described my invention, what I claim, and desire to secure by Letters Patent, is—

The combination, with the main beam A, of the swiveled cross-bar C at the forward end thereof, the draft-rods g passing loosely through the same, the cross-bar B, rigidly secured to the rear of the main beam, and the handle I, secured to the cross-bar midway between its ends, whereby the plow may be turned to either side, substantially as and for the purpose specified.

In testimony whereof I affix my signature in presence of two witnesses.

ISAAC SACHS.

Witnesses:
GEO. C. POULTON,
ROBT. AITON.